Figure 1:
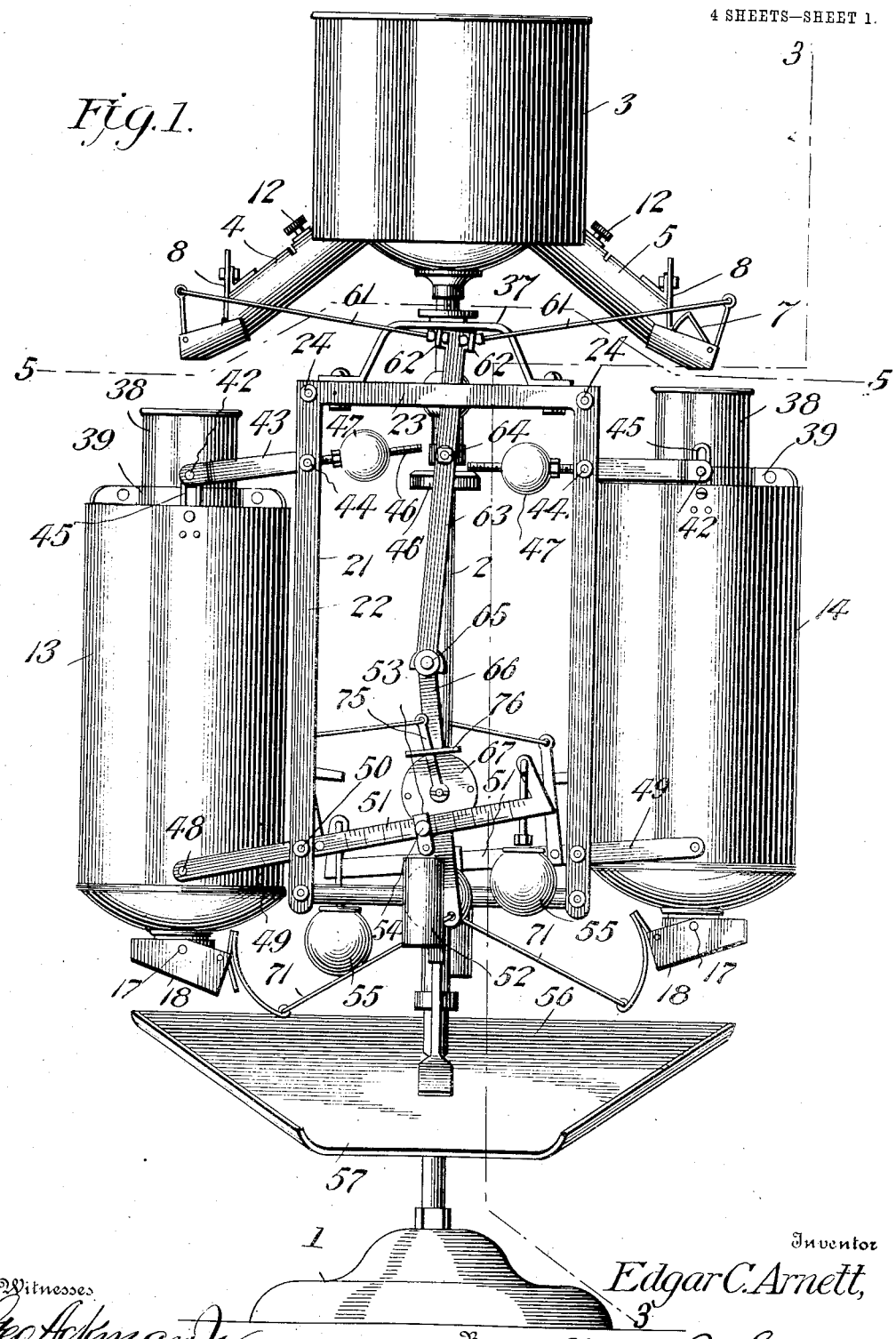

No. 810,694. PATENTED JAN. 23, 1906.
E. C. ARNETT.
AUTOMATIC WEIGHING MACHINE.
APPLICATION FILED JULY 19, 1905.

4 SHEETS—SHEET 1.

Witnesses
Geo Ackman Jr.
C. C. Himes

Inventor
Edgar C. Arnett,
By Victor J. Evans
Attorney

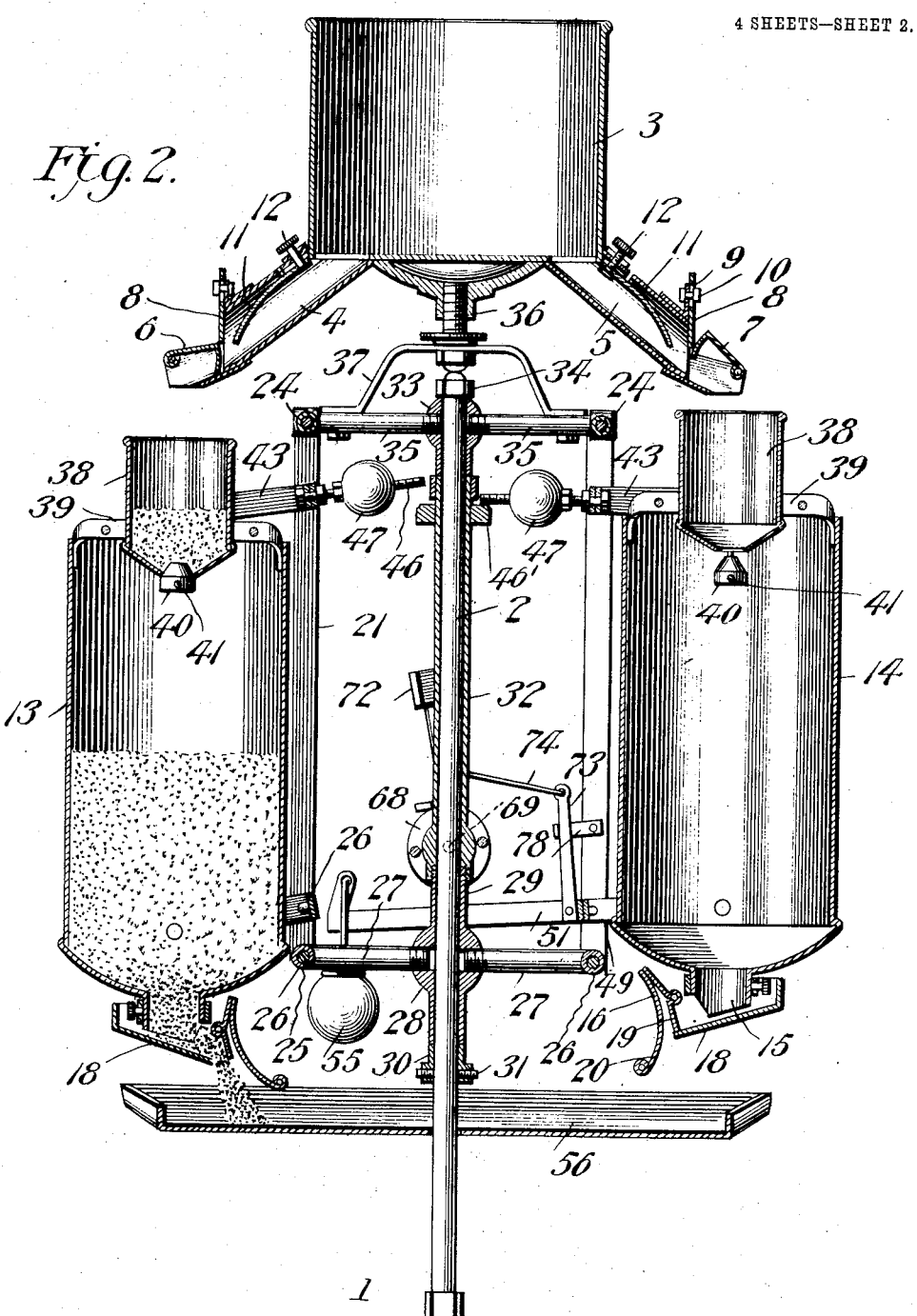

No. 810,694. PATENTED JAN. 23, 1906.
E. C. ARNETT.
AUTOMATIC WEIGHING MACHINE.
APPLICATION FILED JULY 19, 1905.
4 SHEETS—SHEET 3.
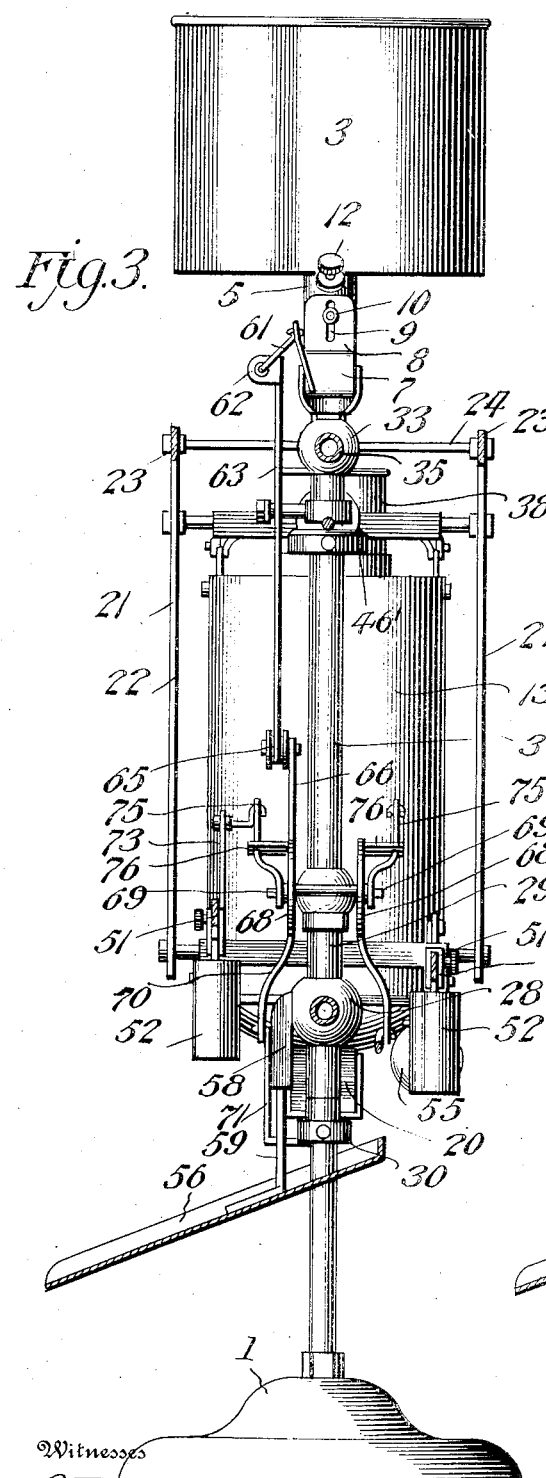
Witnesses
Geo. Ackman Jr.
C. C. Hines.
Inventor
Edgar C. Arnett,
By Victor J. Evans
Attorney No. 810,694. PATENTED JAN. 23, 1906.
E. C. ARNETT.
AUTOMATIC WEIGHING MACHINE.
APPLICATION FILED JULY 19, 1905.
4 SHEETS—SHEET 4.
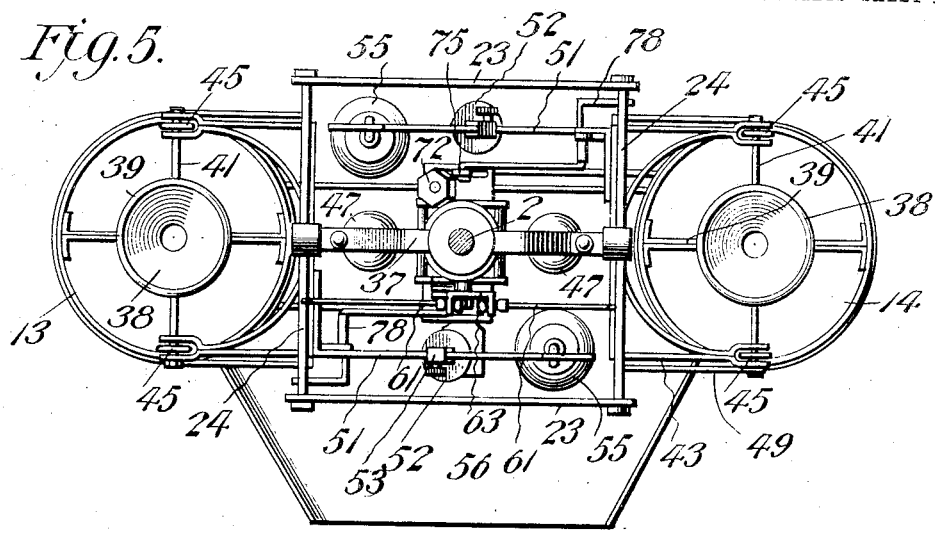
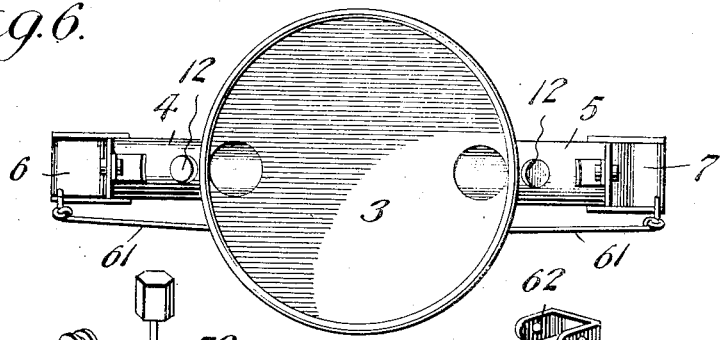
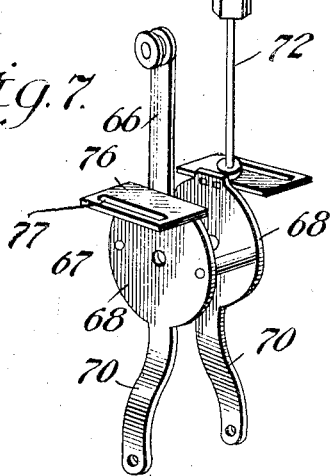
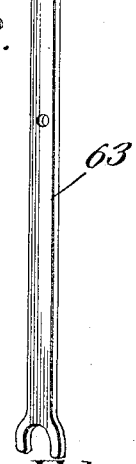
Witnesses
Geo. Ackman Jr.
C. C. Hines
Inventor
Edgar C. Arnett
By Victor J. Evans
Attorney

UNITED STATES PATENT OFFICE.

EDGAR C. ARNETT, OF WASHINGTON, KANSAS.

AUTOMATIC WEIGHING-MACHINE.

No. 810,694.  Specification of Letters Patent.  Patented Jan. 23, 1906.

Application filed July 19, 1905. Serial No. 270,395.

*To all whom it may concern:*

Be it known that I, EDGAR C. ARNETT, a citizen of the United States of America, residing at Washington, in the county of Washington and State of Kansas, have invented new and useful Improvements in Automatic Weighing-Machines, of which the following is a specification.

This invention relates to an automatic weighing-machine adapted to be employed for weighing any desired liquid or comminuted solid, but which is especially designed for the weighing of grain flowing from an elevator or storage-reservoir in predetermined quantities or weights and delivering the same to a chute for discharge to a conveyer or into bags, barrels, or other suitable receptacles in which the grain may be put up for market or storage.

The invention has particular reference to that class of weighing-machines embodying a pair of weighing-receptacles to which the grain is alternately delivered and having automatically-operated gates or valves for controlling the delivery of the material thereto and discharge of the same therefrom; and the object of the invention is to provide a weighing apparatus of this character which dispenses with the use of the ordinary gate-latch mechanism, which is revolubly mounted upon its support to enable the position of the delivery-chute to be varied to discharge material at any desired point in its plane of revolution, which embodies a novel construction of weighing-receptacles and mechanism insuring durability, strength, and accuracy, and which generally simplifies and improves the construction and increases the practical efficiency of this type of weighing apparatus.

With the above and other objects in view the invention consists of the novel construction, combination, and arrangement of parts hereinafter fully described and claimed, reference being had to the accompanying drawings, in which—

Figure 1 is a front elevation of a weighing-machine embodying my invention, showing one of the weighing vessels lowered to discharge the material weighed therein. Fig. 2 is a central vertical longitudinal section thereof. Fig. 3 is a front to rear section taken substantially on the line 3 3 of Fig. 1. Fig. 4 is a similar section through one of the weighing vessels. Fig. 5 is a horizontal section of the machine, taken on line 5 5 of Fig. 1. Fig. 6 is a plan view of the hopper or storage-receptacle. Fig. 7 is a detail perspective view of the oscillating head or member for operating the gate-shifting mechanism. Fig. 8 is a similar view of the rocker-arm coacting therewith to actuate the gates of the feed-chutes, and Fig. 9 is a detail section showing the adjustable support of the delivery-chute.

The numeral 1 in the drawings represents a suitable base from which rises a supporting post or standard 2, supported upon the upper end of which is a hopper 3, which may constitute the storage compartment or reservoir of a grain-elevator. This hopper is provided with outwardly and downwardly inclined discharge-chutes 4 and 5, provided at their outer ends with gates or valves 6 and 7 for controlling the discharge of the flowing material therefrom. Each chute is provided at its outlet end with a slide 8 to regulate the size of the eduction-opening, said slide being formed with a slot 9 for the reception of a bolt or screw 10 to adjustably secure it to the chute. In each chute is a feed-regulator 11, comprising a spring-strip coextensive in width with the chute and having a downwardly-curved outer end terminating in rear of the eduction-opening below the slide 9 and free to have an upward yielding movement to compensate for irregularities in the feed and condition of the material while acting to prevent sudden spouting or spurting of the same from the chute. The regulator is secured at its upper end to the upper wall of the chute by a securing-screw or other suitable fastening 12.

Arranged below the chutes 4 and 5 and at opposite sides of the post or standard 2 are weighing receptacles or vessels 13 and 14, each of which is provided with a bottom discharge-nozzle 15, encompassed by a holding-ring 16, to which is pivoted, as shown at 17, a delivery-spout 18. The spout 18 is in the form of a box open at its upper side and inner end and having an inclined bottom wall for conducting the discharging material to said inner end, through which it is discharged. A pivoted valve or gate 19 controls the discharge of the material from the spout and is provided with a crank-arm 20 for connection with the gate-operating devices hereinafter described.

The weighing vessels or receptacles are carried by a supporting-frame 21, revolubly mounted upon the standard 2 and comprising pairs of spaced vertical frame-pieces 22, disposed at the front and rear of the standards, each pair of the vertical pieces being connected at their upper ends by a crosspiece 23. The upper ends of the front and rear portions of the frames so formed are connected and braced by rods 24 and the lower ends thereof by rods 25, surrounded by sleeves 26, said sleeves 26 being secured by radial arms 27 to a head or enlargement 28, formed on a sleeve 29, embracing the post or standard and abutting at its lower end against a stop-collar 30, adjustably secured on the standard by set-screws 31. The sleeve 29 is threaded at its upper end to a sleeve 32, also surrounding the standard and provided at its upper end with a head or enlargement 33, held from upward movement on the standard by a nut or stop-head 34 and to which are secured arms 35, connected with the upper tie-rods 24, thus rigidly connecting the frame 21 with a hub formed by the sleeves 29 and 32, which is adapted to turn upon the post or standard 2 to permit the weighing-receptacles 13 and 14 to be swung in a horizontal plane for discharging the material at any desired point in the path of rotary movement thereof. The hopper 3 may be supported in any preferred manner, but is shown in the present instance fastened by a bolt 36 to a bowed crown-piece 37, fixed to the arms 35, whereby the hopper is adapted to rotate with the frame to always maintain the chutes 4 and 5 above the weighing vessels or receptacles.

Each weighing vessel or receptacle is provided with a superposed inlet-chamber 38, constituting a superposed auxiliary weighing-receptacle, which is supported in the mouth or open upper end thereof by a spider 39, secured at the ends of its arms to the receptacle. The auxiliary receptacle 38 is provided with a conical bottom having an outlet controlled by a valve 40, said valve being carried by an inverted-yoke-shaped or bail-shaped stem 41, having trunnion ends 42 pivotally engaging the outer ends of a swinging yoke-support 43, pivotally mounted upon and between the vertical pieces 22 at the adjacent side of the frame, as indicated at 44. This yoke also constitutes an upper support for the main weighing vessel or receptacle, which is provided at its upper end with slotted hangers 45, through which the trunnion ends 42 of the stem 41 pass. This construction forms a shifting or "lost-motion" connection between the weighing vessel or receptacle and the yoke 43 to permit said vessel to have a preliminary downward movement or traverse to bring the valve 40 into position to close the outlet in the auxiliary receptacle 38, and thereby cut off the feed of the material from the hopper to the main vessel before the full amount has been weighed. To the inner arm of the yoke-support 43 is connected a stem 46, threaded to receive an adjustable weight 47, constituting a scale-beam and weight for the auxiliary receptacle 39 and a partial counterbalance for the main weighing-receptacle. Each main weighing-receptacle is pivotally connected at its lower end, as indicated at 48, to the arms of a swinging yoke 49, pivoted at 50 to the frame 21. Attached to the yoke 49 is a scale-beam 51, which may be suitably graduated to receive a counterbalancing-weight 52, said weight being provided with a sleeve 53, slidably engaging the beam and adapted to be fixed in adjusted position thereon by a set-screw 54. The outer end of the beam 51 may carry a counterpoised weight 55 for the purpose of suitably counterbalancing the scale-beam when the weight 52 is at zero on the scale-beam. An inclined chute or apron 56, having a contracted delivery-spout 57, is provided with an opening for the passage of the post or stem 2 and is adjustably connected with the sleeve 29, preferably by providing said sleeve with a socket 58 to receive an arm 59, extending upwardly from the chute, the upper end of said arm being formed with a series of openings for the passage of a set-screw or bolt 60, adjustably fastened in the socket, as indicated in Fig. 9. The chute is thus adapted to rotate with the frame and weighing-receptacle and receives the alternate discharge of grain from said receptacle and conveys the grain therefrom to a common point for the purpose of bagging or packaging the same. A stop or rest 46' is carried by the sleeve 32 to support the stems 46 when the latter are in normal position and to limit the downward or return movement thereof when the weighing-receptacles return to normal position.

The feed of grain to the weighing-receptacles and the discharge of the same therefrom are automatically controlled through the medium of the valve or gate shifting mechanism, which I will now proceed to describe.

Connected with the discharge valves or gates of the feed-chutes 4 and 5 are rods 61, which are attached to ears or wings 62 upon the upper end of a rocker-arm 63, pivoted at 64 to the sleeve member 32 of the hub and jointed at its lower end, as indicated at 65, to an arm 66, carried by an oscillating shifting head 67, comprising rigidly-joined spaced disks 68, loosely mounted on fixed pivoting-pins 69, projecting laterally from the lower end of the sleeve 32. Each disk or member 68 of the head is formed with a depending arm 70, which arms are respectively connected to the crank-arms 20 of the controlling gates or valves 19 of the said spout 18 of the main weighing vessels or receptacles 14 by connecting-rods 71. The head 67 also carries a counterpoise-weight 72 to normally hold it and the rocker-arm 63 at an angle to the vertical or shifted to one side of the neutral position to hold the valve 7 of one of the feed-chutes open and the discharge-valve 19 of the underlying main weighing-receptacle closed for the feed of the grain thereto and to simultaneously hold the valve of the other feed-chute closed and the discharge-gate of the coöperating underlying weighing-receptacle open. In the present instance I have represented the shifting connections as constructed and arranged to normally hold the gate 7 of the feed-chute 5 and the valve 19 of the vessel 14 closed, while simultaneously maintaining the valve 6 of the feed-chute 4 closed and the gate of the coöperating main weighing-receptacle 13 open, this being the arrangement of said valves when the parts are in their normal position.

In order to shift the head 67 suitable operating connections are provided, one set for each weighing-receptacle, each set comprising in the present instance a lever-arm 73, fixed to the lower swinging yoke 49 and operatively attached by a connecting-rod 74 to a trip-arm 75, loosely pivoted upon the contiguous pivot-pin 69 of the shifting head and adapted to move independently thereof. The coöperating disk or member of the shifting head carries a contact member 76 in the form of a laterally-projecting flange or plate provided with a longitudinal slot 77, through which the trip-arm 75 extends, the arm normally lying at a point midway of the length of the slot and adapted when moved in one direction or the other to contact with one of the end walls of said slot and transfer motion to the head 67 to shift the same for operating the gates or valves. A stop 78 is provided upon the frame to limit the inward swinging movement of each lever-arm 73.

The operation is as follows: Fig. 2 of the drawings represents the vessel 13 and its inlet-chamber 38 as having received a load or charge of the material and being moved downwardly under the weight thereof to the extent of its first or preliminary traverse and in which it will be seen that the portion of the material contained in the vessel 13 is discharging onto the chute 56 through the delivery-spout 18, while that portion of the material contained within the superposed vessel 38 is still held confined by the valve 4. This figure, as well as Fig. 1, shows the vessel 14 in position to be filled with material from the hopper 3. The material feeds from the hopper through the chute 5 into the superposed auxiliary receptacle 38, and thence into the vessel 14, the discharge of the material from said vessel being prevented by the valve 19, which is in closed position. As soon as the vessel 14 becomes filled with a sufficient quantity of the material to overcome the resistance of the counterpoised weight 52 said vessel will descend to the extent permitted by the slotted hangers 45, thus allowing said vessel to have its preliminary traverse or downward movement, which is arrested by the resistance of the weight 47. This downward preliminary movement to the vessel 14 swings the valve 40 into position to close the outlet of the superposed auxiliary receptacle 38, thus preventing the material feeding therein from the chute 5 from passing into the vessel 14. The two vessels 14 and 38 remain in the described position until the amount of material filled into the vessel 38 is sufficient to overcome the resistance of the weight 47, when said vessels will descend or make their final downward traverse. The preliminary traverse of the vessel is permitted without opening the valve 19, owing to the fact that the trip-arm 75, operated by said vessel, is free to move within the slot 77 of the coacting contact-plate 76 of the shifting head 67, so that the material within the vessel 14 will be confined therein while the vessel 38 is filling and will not be discharged until said vessel 14 makes its final downward traverse, this final movement bringing the trip-arm 75 into engagement with the outer end wall of the slot 77 in the coacting contact-plate 76 and causing the head 67 to be shifted to open the discharge-valve 19 of the vessel 14 and close the controlling-valve 7 of the chute 5, while simultaneously opening the controlling-valve 6 of the chute 4 and closing the discharge-valve 19 of the vessel 13. The valve 30 of the superposed inlet-chamber or auxiliary receptacle 38, connected with the vessel 14, remains closed to confine the material therein until said vessel 14 is partially elevated by the action of the weight 52, which movement is permitted by the loose engagement of the slotted hangers 45 with the trunnion-pins 42 of the stem of the valve 40, the latter being opened at this stage to cause the material contained in the auxiliary vessel 38 to discharge into the vessel 14, and thence to the chute 56, whereupon the weight 47 restores the vessel 14 to its fully-elevated or normal position. This elevation of the vessel 14 to its normal position will be effected without shifting any of the other valves of the machine, as the trip-arm 75, connected therewith, will simply return to its normal position in the slot 77 of the coacting shifting plate 76 of the shifting head 67, and the controlling-valve 7 of the chute 5 will therefore remain closed until automatically opened by the descent of the vessel 13. By providing each main weighing vessel or receptacle 14 with a superposed entrance-chamber and auxiliary weighing-receptacle 38 and the valve 14 and coöperating parts, as described, the full descent of the main vessel and the beginning of the discharge of its contents before said vessel is fully supplied with the proper weight of material is prevented and absolute accuracy in weighing thereby insured, and this construction further avoids the necessity of weighing a part of the material while it is in transit. When the vessel 14 reaches the limit of its downward movement, the trip-arm 75, actuated thereby, will engage and operate the shifting member 76 to move the shifting head 67 to the reverse position to that shown in Fig. 1, thus operating the parts of the shifting mechanism to close the valve 7 of the chute 5 and open the valve 6 of the chute 4 to cut off the feed of material to the vessel 14 and permit of the feed of the material to the vessel 13 and to simultaneously open the valve 18 of the vessel 14 and close the corresponding valve of the vessel 13. The vessel 13 will then be automatically filled from the hopper and will operate in the same way and upon reaching the limit of its downward movement will throw the valve-shifting mechanism back to the position shown in Fig. 1, thereby resetting the parts for a repetition of the operation of filling and discharging the load from the vessel 14, previously described. It will thus be seen that the apparatus is entirely automatic in operation and that, owing to the mode set forth of weighing out the material and the manner of disposing the weighing-receptacles on opposite sides of the central post 2, a proper balancing of the parts and an accurate weighing out of the material are insured.

As before stated, the apparatus may be employed for weighing any desired liquid or comminuted solid, and therefore I do not limit it in use to the weighing of grain, although especially designed therefor. In practice the hopper 3 may be supported from the frame of the apparatus, as shown, or may constitute the rotary feed-hopper or storage-compartment of a grain-elevator. It may also be disposed at the outer end of the storage-compartment of the elevator to form a shifting discharge-gate.

Having thus described the invention, what is claimed as new is—

1. In a weighing apparatus, the combination with a feed device, of weighing mechanism embodying a load-receiver provided with an entrance-chamber, a valve controlling the flow of material therefrom to the receiver, means for closing said valve when the receiver has made a partial traverse, a valve controlling the discharge of material from the receiver, and means for opening the discharge-valve when the controlling-valve is closed, cutting off the feed when the receiver starts on its final traverse and maintaining the discharge-valve open and opening the controlling-valve in the return movement of the receiver.

2. In a weighing apparatus, the combination with a feed device, of weighing mechanism embodying a load-receiver provided with an entrance-chamber, a valve for governing the feed of material to the said entrance-chamber, a valve controlling the feed of material from the entrance-chamber to the receiver, a valve controlling the discharge of the material from the receiver, and automatic mechanism for controlling said valves to feed material to the receiver until the same is partially filled and cut off the flow from the entrance-chamber to said receiver, to open the discharge-valve on the final traverse of the receiver, and to close the discharge-valve when the receiver reaches the limit of its return movement.

3. In a weighing apparatus, the combination of a frame, upper and lower swinging scale-supports, a receiver pivoted to said supports and having a shifting connection with the upper support permitting it to have a preliminary downward movement independent thereof, a supplementary receiver opening into and movable with the first-named receiver, a valve controlling the discharge of material from said supplementary receiver, said valve being controlled by the upper support and brought to closing position during the preliminary downward movement of the main receiver and feeder for supplying material to the supplementary receiver, a valve controlling said feeder, a valve controlling the discharge of the material from the main receiver, and means for opening the discharge-valve upon the final traverse of the main receiver and simultaneously closing the feed-valve and closing the discharge-valve and opening the feed-valve at the limit of the return movement of the receiver.

4. In a weighing apparatus, the combination with a valve-controlled feeder, of a weighing-receiver provided with an entrance-chamber adapted to discharge thereinto and to receive the material from the feeder, a valve controlling the discharge of material from the receiver, a valve controlling the discharge of the material from the entrance-chamber to the receiver, pivoted weight-controlled supports for the receiver, one of said supports controlling the valve of the chamber, and means for opening the discharge-valve when the receiver reaches the limit of its weighing movement and closing the feed-valve and reversely operating said valves when the receiver returns to its normal position.

5. In a weighing apparatus, weighing mechanism embodying a receiver having two communicating chambers, a feeder adapted to discharge in one chamber for delivery to the other chamber, means for cutting off the flow of the material from the latter-named chamber when a certain proportion of the load is delivered therein, means for cutting off the feed of the material to the other chamber when the balance of the load is received therein, and means for discharging the load.

6. In a weighing apparatus, weighing mechanism embodying a main receiver and a supplementary receiver adapted to discharge thereinto, a feeder adapted to discharge into the supplementary receiver, means for cutting off the feed from the supplementary receiver to the main receiver when the latter has received a certain proportion of the load, means for cutting off the feed from the feeder to the supplementary receiver when the latter receives the balance of the load, and means for discharging the material from said receiver.

7. In a weighing apparatus, weighing mechanism embodying main and supplementary receivers, a feeder adapted to feed material to the supplementary receiver for delivery to the main receiver, means for cutting off the feed of the material from the supplementary receiver to the main receiver when the latter has received a certain proportion of the load, means for cutting off the feed of the material to the supplementary receiver when the latter has received the balance of the load, a discharge device, and means for controlling said discharge device to permit of the discharge of the material from both receivers.

8. In a weighing apparatus, a feed device, weighing mechanism embodying main and supplementary receivers, said supplementary receiver being adapted to receive the material from the feeder and discharge the same into the main receiver, a valve automatically operated when the main receiver has received a portion of the load to prevent the further delivery of the material from the supplementary receiver thereto, a valve for stopping the feed of the material to the supplementary receiver when the latter has received the balance of the load, a discharge-valve upon the main receiver, and means for alternately opening and closing the feeder and discharge-valve at the limits of the movements of the receivers.

9. In a weighing apparatus, a feeder, weighing mechanism embodying a main and a supplementary receiver, said supplementary receiver adapted to receive the material from the feeder and discharge the same into the main receiver, the weighing mechanism being adapted to permit said receivers to have a preliminary and a final traverse in its weighing movement, means for cutting off the feed of the material from the supplementary receiver to the main receiver when the receivers reach the limit of their preliminary traverse, means for cutting off the feed of the material from the feeder to the supplementary receiver when the receivers reach the limit of their final traverse, and means for automatically controlling the feeder and opening and closing the main receiver, when the receivers reach the limit of their weighing and return movements.

10. In a weighing apparatus, the combination of a feeding device, a plurality of weighing mechanisms, each embodying a main and a supplementary receiver, the supplementary receiver being adapted to receive the material from the feeder and discharge into the main receiver, a valve for closing the supplementary receiver when the main receiver has received a certain proportion of the load, a valve for cutting off the feed of the material to the supplementary receiver when the latter has received the balance of the load, a valve for controlling the discharge of the material from the main receiver, and means for alternately operating the valve to control the feed of the material to and governing the actions of the weighing mechanisms.

11. In a weighing apparatus, weighing mechanisms, each embodying a main and a supplementary receiver, said supplementary receiver being adapted to receive the material from the feeder and discharge the same into the main receiver, the weighing mechanism being adapted to permit each main and supplementary receiver to have a preliminary and final traverse in its weighing movement, means for cutting off the flow of the material from the supplementary receiver to the main receiver when the latter has received a portion of the load, means for cutting off the flow of the material from the feeder to the supplementary receiver when the latter has received the balance of the load, means for discharging the material from the main receiver when said receivers reach the limit of their final traverse, and automatic means for controlling the aforesaid means to permit alternate operations of the weighing mechanisms, said automatic means being provided with compensating mechanism to permit the discharge means of each weighing mechanism to remain open until the receivers reach the limit of their return movement.

12. In an automatic weighing apparatus, the combination with a feeder, of weighing mechanism embodying a frame, main and supplementary receivers, said supplementary receiver being adapted to receive the material from the feeder and discharge the same into the main receiver, pivoted supports for the receivers, a shifting connection between the receivers and one of the supports to permit the receivers to have a preliminary downward movement independent of said support, a valve carried by said support and brought by such movement of the receivers into position to close the supplementary receiver, a valve controlling the feeder, a valve controlling the discharge of the material from the main receiver, and means for alternately operating said valves.

13. In an automatic weighing mechanism, a feeder provided with valve-controlled discharges, weighing mechanisms each comprising a main and a supplementary receiver and adapted to be alternately supplied from said discharges, the supplementary receiver being adapted to receive the material from the feeder and discharge the same into the main receiver, pivoted supports for said sets of receivers, valves for cutting off the flow from the supplementary to the main receivers when the latter have received a portion of the load, discharge-valves controlling the discharge of the material from the main receivers, and means for automatically controlling the feeder and discharge-valves, said means including compensating mechanism for maintaining the discharge-valves open upon the return movement of the receivers until an opening of the valves controlling the flow of material from the supplementary receiver is effected to permit said material to feed into the main receiver and discharge.

14. In a weighing apparatus, the combination of a hopper provided with valved feed-chutes, a supporting-frame, weight-controlled receivers pivotally mounted upon the frame, each receiver comprising a main receptacle provided with a discharge-outlet and a supplementary receptacle adapted to receive the material from the receptacle and discharge the same into the main receptacle, each receiver having a preliminary and a final traverse in its weighing movement, a valve operating to open and close the supplementary receptacle as the receiver moves above and below the limit of said preliminary movement, a discharge-valve for each main receptacle, operating means for alternately opening and closing the respective sets of valves, and shifting mechanism for actuating said operating means, said shifting mechanism being alternately operated by the receivers and adapted to permit the discharge-valve of each receiver to remain open until the controlling-valve of the supplementary receptacle is opened and the material in said receptacle is discharged.

15. In a weighing apparatus, the combination of a hopper provided with valved feed-chutes, a supporting-frame, weight-controlled receivers pivotally mounted upon the frame, each receiver comprising a main receptacle provided with a discharge-outlet and a supplementary receptacle adapted to receive the material from the receptacle and discharge the same into the main receptacle, each receiver having a preliminary and a final traverse in its weighing movement, a valve operating to open and close the supplementary receptacle as the receiver moves above and below the limit of said preliminary movement, a discharge-valve for each main receptacle, operating means for alternately opening and closing the respective sets of valves, a shifting device for alternately opening and closing the respective sets of valves, and trips actuated by the receivers to alternately operate said shifting device, said trips and shifting device being coöperatively constructed to permit the discharge-valve of each receiver to remain open until the controlling-valve of the supplementary receptacle is opened and the material in said receptacle is discharged.

In testimony whereof I affix my signature in presence of two witnesses.

EDGAR C. ARNETT.

Witnesses:
JOHN T. SLEIGH,
ELIAS P. LAKE.